UNITED STATES PATENT OFFICE.

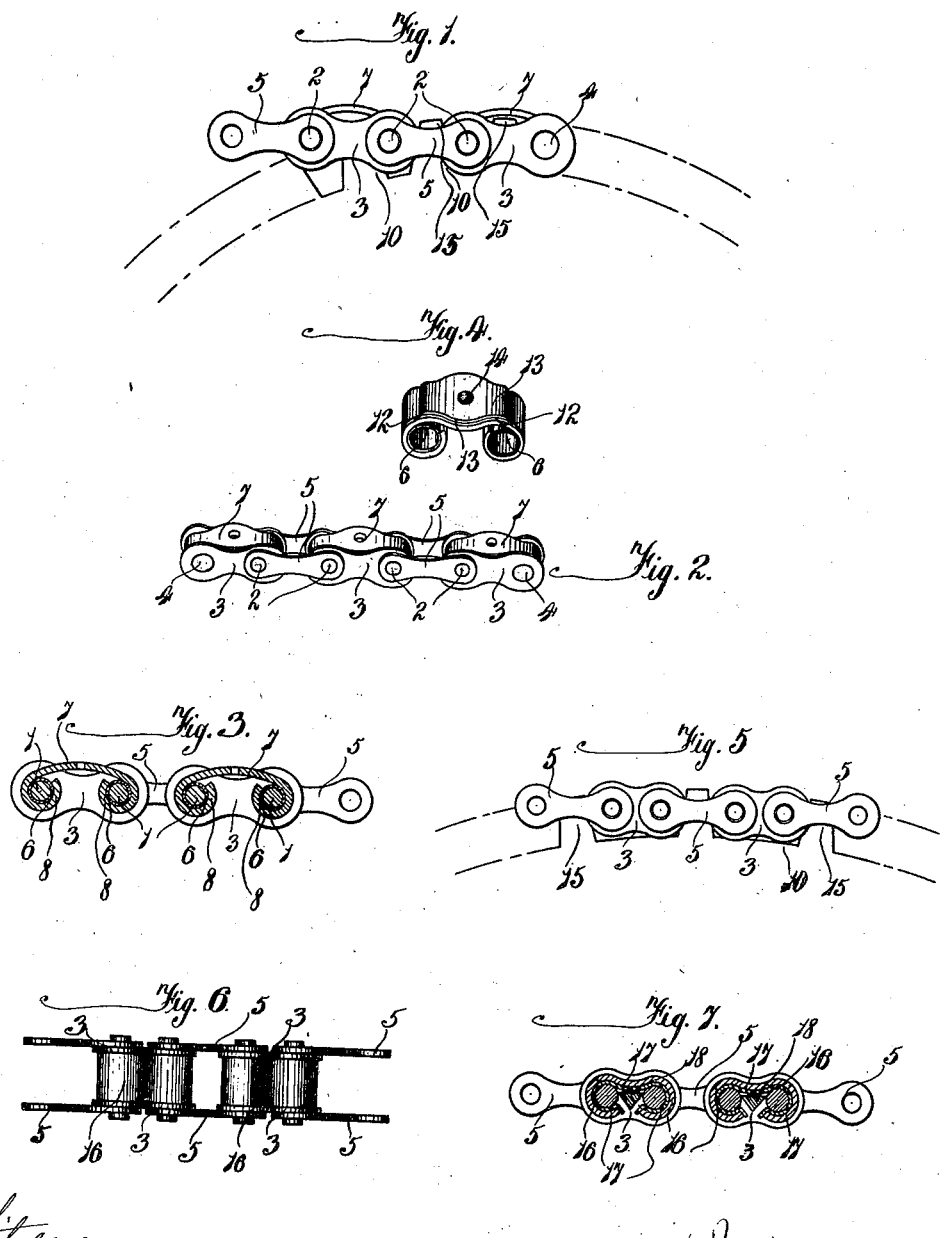

ARTHUR BRAMPTON AND GEORGE WADHAMS, OF BIRMINGHAM, ENGLAND.

DRIVING-CHAIN.

1,090,380.

Specification of Letters Patent. Patented Mar. 17, 1914.

Application filed January 9, 1914. Serial No. 811,238.

*To all whom it may concern:*

Be it known that we, ARTHUR BRAMPTON and GEORGE WADHAMS, subjects of the King of Great Britain, residing at Oliver Street Works, Birmingham, in the county of Warwick, England, have invented a new and useful Driving-Chain; and we do hereby declare the following to be a full, clear, and exact description of the same.

Our invention comprises improvements in driving chains, and refers to that class of such which are constructed with elastic or slightly extensible links; such chains being particularly adapted for absorbing shocks due to the engine explosions in motor cycles or other vehicles without transmitting them to the driving wheel and thereby avoiding liability of fracture of the chain; though being applicable for a variety of other purposes as in mill gearing with a pulsating load, the object of the present invention being to provide an improved chain of this kind.

According to this invention every alternate pair or a less number of adjacent pintles are connected together by a spring member embracing the said pintles; the said spring member also forming the wearing surface, *i. e.* making contact with the sprocket teeth and thus taking the place of the roller or the block usually employed for this purpose.

Referring to the drawings:—Figure 1 is a side elevation of the chain with a sprocket wheel shown in engagement. Fig. 2 is a perspective view of the chain. Fig. 3 is a sectional elevation of same. Fig. 4 illustrates a modified form of link. Fig. 5 is a side elevation of a modified form of the invention. Fig. 6 is a plan of same, and Fig. 7 shows a sectional elevation.

In carrying this invention into practice as shown upon the accompanying drawings at Figs. 1 to 3 the chain includes pintles 1 having reduced ends 2, adjacent pintles being connected by check plates 3 having holes 4 for receiving the portion of the pintle of the larger diameter, these holes being drilled slightly larger than the pintles or otherwise shaped so as to permit a limited movement in the direction of the length of the chain between the pintles and the check plates. The connected pintles and check plates are connected together by outer plates 5 which have suitable holes through which the reduced extremities 2 of the pintles are passed and there riveted over. A hardened steel liner 6 is placed around the middle portion of the pintle and connecting these pintles is a C-shaped spring marked 7, the extremities 8 of which surround or embrace two pintles connected by common check plates, the springs serving to normally retain the pintles at the minimum pitch allowed by the check plates, but permitting the pintles to separate to the extent of the maximum pitch allowed by the check plates under abnormal or sudden loads or shocks. The liner or bush 6 is of course located intermediate between the spring and the pintle. The extremities 8 of the spring form the wearing surface *i. e.* the part which engages with the teeth of the sprocket wheel 10 when the chain is in use, and it will be obvious that a sudden increase in the driving force such as rapid acceleration of the engine or sudden increase in the load will not be transmitted direct to the driven or driving member but will be absorbed by the slight extension permitted in the chain.

At Fig. 4 a slightly modified form of the invention is shown in which the C spring is strengthened by the addition of two plates 12, 13 secured to the spring by a rivet 14 and forming therewith a laminated spring giving increased strength. In both the forms of the invention previously described the teeth 15 of the sprocket wheel may pass between two spring connected pintles, the pitch of the chain corresponding with the pitch of the gear wheel.

At Figs. 5–7 a further form of the invention is shown applied to a chain for the "block" type in which two pintles and their connecting members pass between adjacent teeth of the sprocket wheel. The check plates 3 are connected to the pintles in similar manner to above described but instead of employing a spring of C-shape, a spring 16 after the form of a figure 3 is used, this spring being provided with a liner 17 formed in two parts located between the interior of the spring and the pintles, these two parts of the liner separating when the chain stretches. A felt pad 18 may be provided within the spring for containing lubricant. In this form of chain the spring link again forms the wearing surface.

What we claim then is:—

1. In a driving chain, the combination of a pair of pintles; a pair of inner check plates each having a pair of holes for receiving said pintles, the holes being of a greater size than the pintles, said plates connecting said pair of pintles together but allowing slight relative movement in the direction of the length of the chain and a spring extending between the pintles having its extremities embracing said pintles and serving to normally retain the pintles at their minimum pitch or distance apart, but permitting them to separate to the maximum pitch allowed by the check plates under abnormal loads or shocks, the said spring forming the contacting part which is engaged by the teeth of the sprocket wheel when the chain is in use; substantially as set forth.

2. In a driving chain, the combination of a pair of pintles; a pair of inner check plates each having a pair of holes for receiving said pintles, the holes being of a greater size than the pintles, said plates connecting said pair of pintles together but allowing slight relative movement in the direction of the length of the chain; a spring extending between the pintles having its extremities embracing said pintles and serving to normally retain the pintles at their minimum pitch or distance apart, but permitting them to separate to the maximum pitch allowed by the check plates under abnormal loads or shocks; the said spring forming the contacting part which is engaged by the teeth of the sprocket wheel when the chain is in use; and a hardened steel liner located intermediate between the interior of each of the springs and pintles; substantially as set forth.

3. In a driving chain the combination of a pair of pintles; a pair of inner check plates each having a pair of holes for receiving said pintles, the holes being of a greater size than the pintles, said plates connecting said pair of pintles together but allowing slight relative movement in the direction of the length of the chain; a spring of substantially C shape extending between the pintles and serving to normally retain the pintles at their minimum pitch or distance apart, but permitting them to separate to the maximum pitch allowed by the check plates under abnormal loads or shocks; extensions of the spring embracing the pintles and adapted to be engaged by the teeth of the sprocket wheel when the chain is in use; and a hardened steel liner located intermediate between the interior of each of the springs and the pintles; substantially as set forth.

4. In a driving chain the combination of a pair of pintles; a pair of inner check plates each having a pair of holes for receiving said pintles, the holes being of a greater size than the pintles, said plates connecting said pair of pintles together but allowing slight relative movement in the direction of the length of the chain; a spring of substantially C shape extending between the pintles and serving to normally retain the pintles at their minimum pitch or distance apart, but permitting them to separate to the maximum pitch allowed by the check plates under abnormal loads or shocks; extensions of the spring embracing the pintles and adapted to be engaged by the teeth of the sprocket wheel when the chain is in use; a hardened steel liner located intermediate between the interior of each of the springs and the pintles; and a supplemental spring member secured to the said C shaped spring and forming therewith a laminated spring member; substantially as set forth.

In testimony whereof we affix our signatures in presence of two witnesses.

ARTHUR BRAMPTON.
GEORGE WADHAMS.

Witnesses:
HAROLD J. HORRESTER,
HUGO BARTON.